United States Patent
Narin et al.

(10) Patent No.: US 6,718,549 B1
(45) Date of Patent: Apr. 6, 2004

(54) METHODS FOR MANAGING THE DISTRIBUTION OF CLIENT BITS TO CLIENT COMPUTERS

(75) Inventors: Attila Narin, Kirkland, WA (US); Donald J. Clore, Seattle, WA (US); Keith A. Kegley, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/305,566

(22) Filed: May 5, 1999

(51) Int. Cl.[7] .................. G06F 9/445; G06F 9/44; G06F 15/16; G06F 15/173
(52) U.S. Cl. .................. 717/178; 717/170; 717/173; 709/203; 709/223
(58) Field of Search ............... 717/11, 3, 170, 717/168–169, 171–178; 707/203, 223; 709/223, 232, 204, 106, 316, 209; 710/36

(56) References Cited

U.S. PATENT DOCUMENTS

| | | | | |
|---|---|---|---|---|
| 5,664,206 A | * | 9/1997 | Murow et al. ............... 704/8 |
| 5,717,930 A | | 2/1998 | Imai et al. ................. 717/176 |
| 5,732,275 A | * | 3/1998 | Kullick et al. ............. 717/170 |
| 5,742,829 A | | 4/1998 | Davis et al. ................ 717/178 |
| 5,845,077 A | | 12/1998 | Fawcett ..................... 709/221 |
| 5,903,897 A | * | 5/1999 | Carrier, III et al. ........ 707/203 |
| 6,009,274 A | * | 12/1999 | Fletcher et al. ............. 717/173 |
| 6,049,671 A | | 4/2000 | Slivka et al. ............... 717/173 |
| 6,073,214 A | | 6/2000 | Fawcett ...................... 711/133 |
| 6,074,434 A | * | 6/2000 | Cole et al. .................. 717/173 |
| 6,151,643 A | * | 11/2000 | Cheng et al. ................ 710/36 |
| 6,202,207 B1 | * | 3/2001 | Donohue .................... 717/173 |
| 6,256,664 B1 | * | 7/2001 | Donoho et al. ............. 709/204 |
| 6,256,668 B1 | * | 7/2001 | Slivka et al. ............... 709/220 |
| 6,269,473 B1 | * | 7/2001 | Freed et al. ................. 717/104 |
| 6,282,709 B1 | * | 8/2001 | Reha et al. .................. 717/175 |
| 6,324,691 B1 | * | 11/2001 | Gazdik ........................ 717/178 |
| 6,327,617 B1 | | 12/2001 | Fawcett ...................... 709/219 |

FOREIGN PATENT DOCUMENTS

| | | |
|---|---|---|
| EP | 0 703 531 A1 | 3/1996 |
| EP | 0 809 182 A1 | 1/1997 |
| EP | 0 836 138 A2 | 4/1998 |
| EP | 0 841 615 A2 | 5/1998 |

* cited by examiner

Primary Examiner—Hoang-Vu Antony Nguyen-Ba
(74) Attorney, Agent, or Firm—Woodcock Washburn LLP

(57) ABSTRACT

Methods for managing the distribution of client bits to client computers are disclosed. The methods of the present invention are particularly suited for use in a network environment in which one or more clients are networked with at least one server via a communications network. The communications network can be a LAN, WAN, intranet, or the Internet. The client version of one or more selected applications software components (the "managed components") is determined on the client computer. The client queries the server to determine the most current version of each of the managed components. If the client version is not the most current version, or if the client version is missing on the client computer, a determination is made whether to download the most current version onto the client. If the determination is made to install or upgrade one or more managed components, the most current version of each of the selected managed components is downloaded onto the client computer. The installation or upgrade package is authenticated as it is being downloaded by validating a signature that is appended to the package. After the installation or upgrade package has been authenticated and downloaded onto the client computer, the package is installed onto the client.

26 Claims, 4 Drawing Sheets

METHODS FOR MANAGING THE DISTRIBUTION OF CLIENT BITS TO CLIENT COMPUTERS

TECHNICAL FIELD

The present invention relates generally to the field of client-server computing, and more particularly to a method and system for efficiently and securely distributing software, or client bits, to computers in a network.

BACKGROUND OF THE INVENTION

A client computer connected to a network, such as a local area network, wide area network, an intranet, or the Internet, can download digital information from server computers. Client application software typically accepts commands from a user and obtains data and services by sending requests to server applications running on the server computers. Currently, there are several ways to install application software (sometimes known as "client bits") onto client machines. For example, browsers running on client machines typically have mechanisms for downloading installation packages (such as ActiveX controls or Java Applets) from the World Wide Web. Those approaches bring several limitations with them. For example, browsers have proprietary installation packages that can be downloaded and installed on the user's machine. The browsers also have their own way of verifying code, and there is not one lightweight signing/verification mechanism that works for all browsers. The user is confronted with security issues (e.g., warnings and permission dialogs) before the download of each software item. In many cases, the user will not grant permission for the installation to take place because the user is unsure about the source (and, consequently, the authenticity and the integrity) of the software. To update the client bits, the user would have to know about available updates and go to a download site to get the update. That is, the update is not made automatically as soon as new client bits are available. Creating an installation package that works with any browser brings with it a large overhead, resulting in an increase in download size and download time. Moreover, international users would have to know about localized versions of the software to install it.

In sum, with the proliferation of computers into homes and businesses throughout the world, and with the rapid pace of innovation of new and updated versions of application software, there has emerged a need for an efficient, secure mechanism to provide new and updated application code, or client bits, to users.

SUMMARY OF THE INVENTION

The present invention provides a computer network-based method for managing the distribution of application software to a client computer. Generally, the method comprises installing on the client a software versioning engine that is associated with one or more applications packages. By prior agreement, when any of the associated applications is initiated, the application will first launch the versioning engine. The versioning engine determines whether the current version of the associated application is installed on the client. If the version installed on the client is not current, the versioning engine determines (e.g., by asking the user) whether or not to update the code on the client. If an update is desired, the versioning engine updates the client bits by, for example, causing a server to download the current version of the application code to the client.

In a presently preferred implementation, the versioning engine comprises a first, lightweight component that is distributed to client computers as part of, or in conjunction with, one or more associated applications. The lightweight component functions as a bootstrap to detect the presence, or lack thereof, of a second component of the versioning engine—a core install and upgrade component. If the second component is not present on the client machine, or if it is not current, the current version of the second component is downloaded from a server to the client. The second component, the core install and upgrade component, determines whether the version of the associated application installed on the client machine is current and, if not, it requests updated code from the server. A third component of the versioning engine is a resource and language component that functions to verify that the user interface employed by the versioning engine is appropriate for the current language setting of the client before the user interface associated with the versioning engine is presented to the user.

The present invention is suitable for use in connection with any type of computer network comprising at least one server and one or more clients. Thus, the invention may be employed to manage the distribution of client bits over a local area network, wide area network, intranet, or the Internet.

These and other features of the present invention are described in greater detail below.

BRIEF DESCRIPTION OF THE DRAWINGS

The foregoing summary and the following detailed description of presently preferred embodiments are better understood when read in conjunction with the appended drawings, in which.

DETAILED DESCRIPTION OF PREFERRED EMBODIMENTS

Overview

Figure 1:
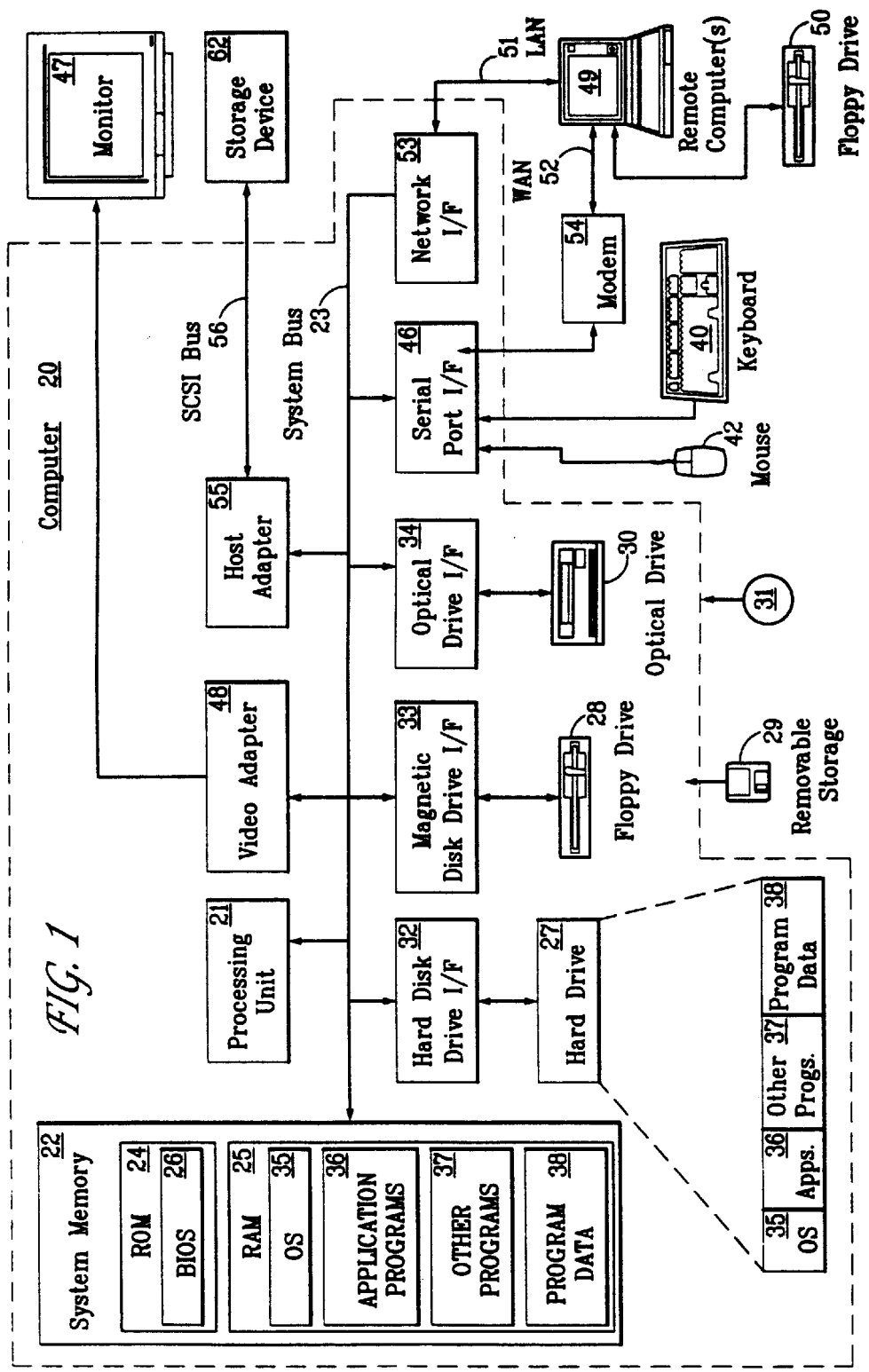
FIG. 1 is a block diagram representing a general purpose computer system in which aspects of the present invention may be incorporated.

As discussed above, the present invention was developed in the process of devising an improved system for delivering client bits to users' machines. The need for such a system is apparent. Indeed, to be successful in today's increasingly competitive world of Web sites and Internet portal sites, for example, as well as the general field of providing new and improved software to users around the world, it is desirable to provide the most current and useful software to client machines. To attract loyal users of a Web site, for example, it is necessary to provide high-quality services, personalized content, fast response times, and an overall rich user experience. One strategy for achieving this is to move away from a server-only approach and to transfer functionality to the client machine to assist in enhancing the user experience. In one approach, a portal site is rendered by the client bits on the client machine and only the raw data (e.g., stock quotes, weather information, etc.) would have to be downloaded from the server. This assumes that client bits and some of the static content of the page are present on the user's machine. In another approach, client bits manage the user's profile (e.g., preferences, settings, etc.), which saves roundtrips to servers that store user preferences. Again, to facilitate this, client bits would be installed on the user's machine. As illustrated in these two examples, the first step to the client bit strategy is to solve the problem of bringing client bits to the users' machines in a timely, reliable, efficient, and secure manner.

A presently preferred implementation of the present invention provides an improved way to manage certain application software components (referred to as "managed components") on a network of client computers linked to a common server. Briefly, according to the invention, a versioning engine is installed on a client computer to ensure that the client version of the managed components is the most current version available. More particularly, the versioning engine is executed, or launched, every time the user connects to the network (i.e., goes online). Before the user interface for the network portal is presented to the user, the versioning engine looks to the server for a file that includes a list of managed components. The file includes, for each managed component, a version indicator that represents the server version of the managed component (i.e., the most current version of the managed component available).

The versioning engine compares the client version of each managed component to the server version. If any of the managed components are missing, or if the client version is out-of-date (i.e., older than the server version), the versioning engine notifies the user and gives the user the option of having the server version of the managed component installed. If the user elects to have the managed component installed or updated, the versioning engine causes the server to download an installation or upgrade package for the managed component to the client.

For security reasons, the installation or update package includes a signature created using a known key. The versioning engine identifies the signature to verify that the installation or upgrade package is authentic. If the package is authentic, the versioning engine proceeds to install or upgrade the managed component on the client. Otherwise, the installation or upgrade package is not downloaded. This insures that only authentic code is downloaded to the client.

The present invention addresses the shortcomings of the prior art in several ways. For example, the installation and versioning engine can download installation packages in a browser agnostic way. That is, it can use any browser's download engine. To verify the authenticity of the installation packages, a lightweight signing/verification mechanism is used. The engine has its own private/public 1024-bit key to create and verify an MD5 (Message Digest 5) signature. The engine only installs authenticated software. The user is presented with a simplified dialog and can be sure that the software that is about to be installed is authentic. The engine automatically identifies components that are out-of-date or missing on the user's machine and suggests that they be updated when the user is online. The engine includes the necessary tools to perform installations and uses components already installed on the system to perform parts of the task. If the managed components have versions localized for the language of the user, the engine can recommend those. To install the versioning engine onto the user's machine, an initial version is deployed with other components being installed from the server. Once on the users' machines, the engine takes care of its own upgrades.

The present invention will now be explained in greater detail with reference to a presently preferred embodiment thereof. First, a description of exemplary computer and network environments is provided, and then a detailed description of the inventive method and system for managing the distribution of client bits is provided.

Computer Environment

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29, and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner, or the like. These and other input devices are often connected to the processing unit 21 through a serial port interface 46 that is coupled to the system bus, but may be connected by other interfaces, such as a parallel port, game port, or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Network Environment

Figure 2:
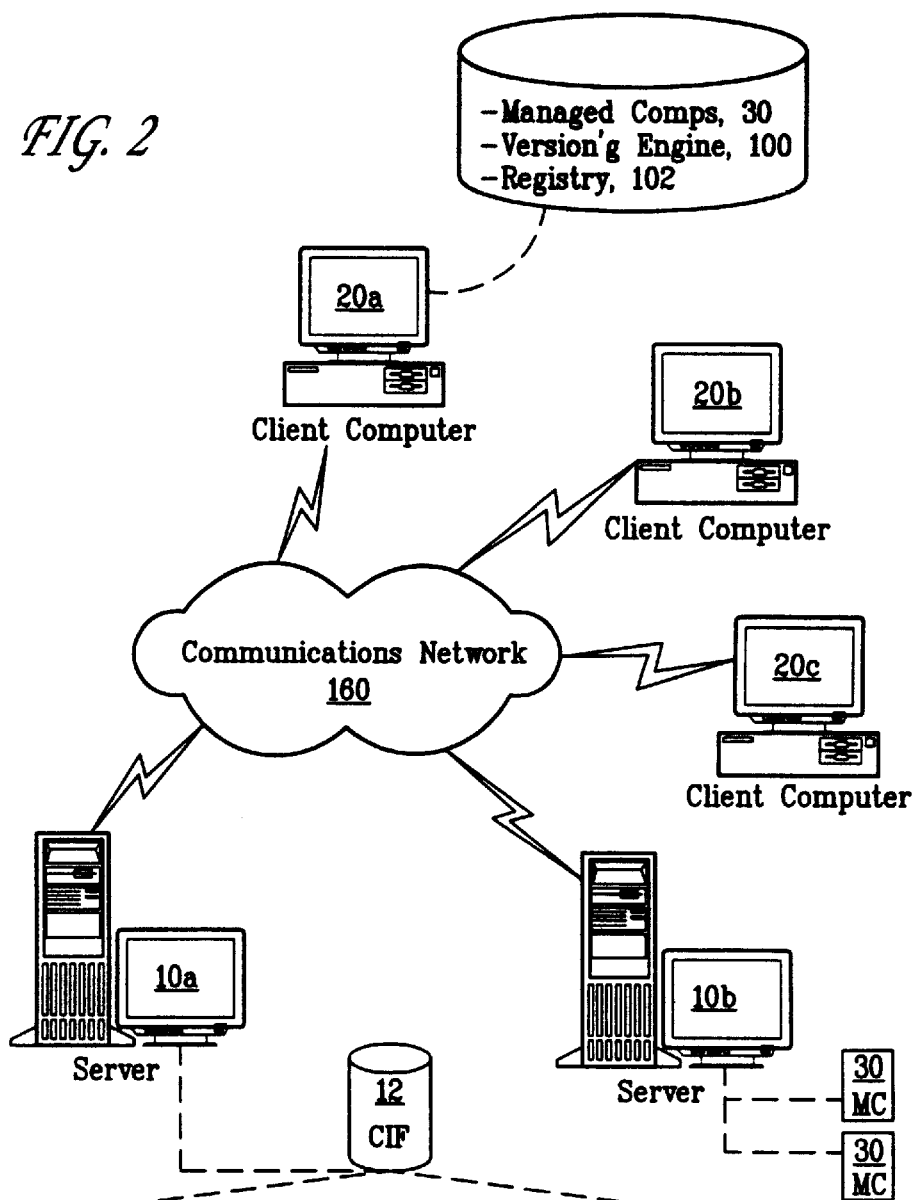
FIG. 2 is a schematic diagram representing a computer network in which aspects of the present invention may be incorporated.

As noted, the computer described above can be deployed as part of a computer network. In general, the above description applies to both server computers and client computers deployed in a network environment. FIG. 2 illustrates one such exemplary network environment in which the present invention may be employed.

As shown in FIG. 2, a number of servers 10a, 10b, etc., are interconnected via a communications network 160 (which may be a LAN, WAN, intranet or the Internet) with a number of client computers 20a, 20b, 20c, etc. In a network environment in which the communications network 160 is the Internet, for example, the servers 10 can be Web servers with which the clients 20 communicate via any of a number of known protocols such as hypertext transfer protocol (HTTP). Each client computer 20 can be equipped with a browser (not shown) to gain access to the servers 10. As shown, server 10a includes a component information file (CIF) 12 and server 10b includes one or more managed components 30. The CIF 12 and managed components 30 will be described in greater detail below. In addition, the client machines include one or more managed components 30, a versioning engine 100 and a registry file 102, all of which may be stored on a hard disk or other non-volatile computer readable storage medium.

Method and System for Distributing Client Bits

Figure 3:
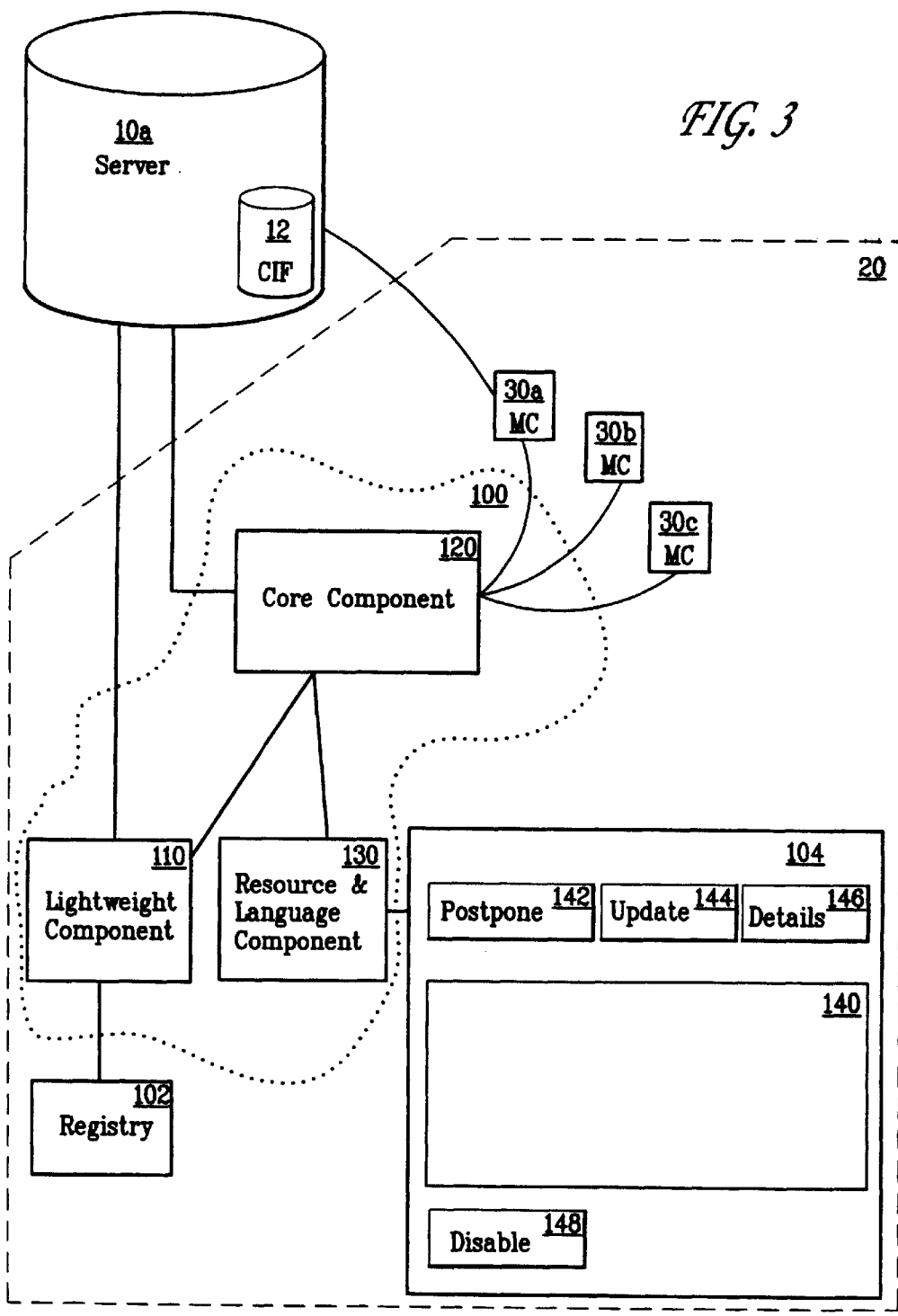
FIG. 3 is a more detailed schematic diagram of a system for managing the distribution of client bits in accordance with the present invention.

FIG. 3 is block diagram of a presently preferred implementation of a client bits installation and versioning engine according to the present invention. Versioning engine 100 includes three components: a lightweight component 110, a core component 120, and a resource and language component 130. Although a versioning engine 100 according to the present invention can be implemented any number of ways (e.g., the versioning engine can be one component), there are several benefits to dividing the functionality of the versioning engine 100 into three separate components. First, for reasons that will be described below in greater detail, only the lightweight component 110 needs to be installed on the client initially. This reduces the overhead associated with the initial installation. Second, the versioning engine 100 will have the ability to update itself when more current versions of the versioning engine 100 become available. Third, the versioning engine 100 can be localized each time it is executed and can manage internationalized components. Each of these components, and the interactions between them, will be described in detail below.

Initially, only the lightweight component 110 is installed on the client 20. The lightweight component 110 can be installed by itself, or in connection with the installation of other client bits. The lightweight component 110 can be installed from an external computer-readable medium such as a magnetic diskette or CD-ROM, etc., or it can be downloaded onto the client 20 from the server 10. For example, in the event that a particular software package is being installed on the client 20 by being downloaded from the server 10, the lightweight component 110 can be downloaded from the server 10 and installed on the client 20 at the same time. It is desirable, therefore, that the lightweight component 110 be as small as possible so as not to add unwanted overhead to the download from the server 10. Preferably, the lightweight component has an uncompressed size of less than about 20 kilobytes. In one embodiment, the lightweight component 110 has an uncompressed size of between 18 kilobytes and 19 kilobytes.

The user does not interact directly with the lightweight component 110. Instead, when the user attempts to connect to the network (i.e., to establish a connection to the server 10), the host client executes the lightweight component 110. The lightweight component 110 performs two main functions. First, it manages the core component 120 by ensuring that the latest version of the core component 120 exists on the client computer 20. Then, the lightweight component 110 launches the core component and terminates itself.

To ensure that the latest version of the core component 120 exists on the client computer 20, the lightweight component 110 checks the registry 102. The registry 102 is a file that resides on the client 20 that includes dynamic link libraries (DLLs) for components the user has registered. The lightweight component determines from the registry 102 whether the core component has been installed on the client machine and, if so, the lightweight component determines from the registry the version number of the client version of the core component 120.

To determine whether the client 20 has the most current version of the core component 120, the lightweight component 110 consults the CIF 12 on server 10a. The CIF 12 identifies the most current version of the core component 120 available on the server (i.e., the server version of the core component 120), and the Universal Resource Locator (URL) of the installation package for the server version of the core component 120. The lightweight component 110 then compares the server version of the core component 120 to the client version.

The lightweight component 110 can compare the client version and the server version in a number of ways. For example, the lightweight component can assume that if the server version number differs from the client version number that the server version is the most current version. In another example, the CIF can include the date and time the server version was created. If the date and time of the server version postdates the date and time the client version was created, the lightweight component 110 will install the server version.

If the lightweight component determines that the server version is more current, or that the core component 120 is missing from the client, the lightweight component provides an indication that the client version differs from the most current version. Preferably, the lightweight component 110 indicates to the server that the client version differs from the most current version by requesting the installation package for the server version of the core component 120. More generally, however, the lightweight component could provide such an indication to another routine running on the client, or write to a library file that keeps track of which components are missing or out-of-date, etc.

Preferably, the installation package resides on the same server 10a that has the CIF 12, although it can reside on a second server 10b (not shown in FIG. 3). The lightweight component 110 communicates with the server 10 using HTTP. Consequently, the lightweight component 110 can use any browser's download mechanism to download the installation package by using HTTP "GETS" to a URL. In this way, the versioning engine 100 is browser agnostic. The server 10 responds by downloading a compressed version of the core component 120 onto the client computer 20. The lightweight component 110 then proceeds to verify the authenticity of the new version of the core component and then to install it onto the client computer 20.

In one exemplary embodiment, an installation package is a cabinet file (i.e., a ".cab" file). To ensure that only authentic files are installed onto the client, the file is signed using a private 1024-bit key that results in a 136-byte signature that is appended to the file. A 1024-bit public key is encoded into the lightweight component 110 to verify the signature attached to the installation package.

Once the lightweight component 110 has verified the authenticity of the installation package, the lightweight component 110 expands the compressed version of the core component 120 and installs the expanded version of the core component 120 onto the client 20 via an install script included in the cabinet file. The lightweight component 110 then updates the entry for the core component 120 in the registry 102.

After the lightweight component 110 ensures that the most current version of the core component 120 exists on the client 20, the lightweight component 110 launches the core component 120 and then terminates itself. In this way, the lightweight component 110 behaves like a bootstrap component.

If the lightweight component 110 encounters any errors (e.g., the lightweight component is unable to connect to the server; the necessary registry entries are not found, etc.), the lightweight component 110 terminates itself without launching the core component 120. Because the user does not interact with the lightweight component 110, the user will be unaware that anything has happened and the client 20 will simply continue to use the existing client versions of the managed components.

In a preferred embodiment, the lightweight component 110 includes a run interval, preferably defaulted to 24 hours. That is, even though the user may connect to the network more frequently than the run interval (e.g., more than once in a 24 hour period), the lightweight component 110 checks for updates only once every 24 hours. Because, as will be discussed in greater detail below, the user is notified if any of the managed components are missing or out-of-date, the use of a run interval prevents the user from being so notified more frequently than the user might care to be. Preferably, the run interval can be changed based on an instruction in the CIF 12.

The core component 120 determines whether a more current version of any of the managed components 30a, 30b, 30c is available from the server and, if necessary, installs or upgrades them on the client 20. The core component 120 downloads the CIF 12 from the server onto the client 20. The CIF 12 includes a list of managed components 30 as well as certain information corresponding to each. For example, in a preferred embodiment, the CIF 12 includes the server version number for each managed component 30, along with a location of the installation package for that component. The CIF 12 also preferably includes a description of each managed component, including its download size, etc.

The CIF 12 can also include inventory information, i.e., information that enables the core component 120 to determine whether a managed component 30 is out of date. For example, inventory information can include a version stamp for a .DLL or .EXE file, a time stamp, or the presence of a registry key. Although a managed component 30 can be made up of several files, it is preferred that only one file be used for inventory control. For example, consider a managed component 30 made up of the following files:

| | |
|---|---|
| abc.txt | version 1.0.0.1 |
| def.dll | version 1.0.0.1 |
| ghi.exe | version 1.0.0.1 |
| jkl.dat | version 1.0.0.1; | and that the update for that managed component 30 includes the following files:

| | |
|---|---|
| abc.txt | version 1.0.0.2 |
| def.dll | version 1.0.0.3 |
| ghi.exe | version 1.0.0.2 |
| jkl.dat | version 1.0.0.1. |

In this example, any of the files abc.txt, def.dll, or ghi.exe could be used for inventory. Notice that no update would be triggered if jkl.dat were used for inventory because its version did not change. This file is, therefore, unsuitable for inventory.

Preferably, the CIF 12 also includes an installation type indicator for each managed component 30. In a preferred embodiment, the installation types that can be associated with a managed component include, but are not limited to, the following four types. First, a component can be an "optional" component, indicating that the user can choose not to install the component. Second, a component can be a "mandatory" component, indicating that the user cannot reject the component. For example, if the lightweight component is out-of-date or missing, the user is not consulted before the installation of a new version. Third, a component can be a "dependent" component, indicating that it is a part of another component. Fourth, a component can be a "no user interface" (NOUI) component, indicating that the component must be installed before any user interface is presented to the user. For example, for reasons that will be described in greater detail below, updates to the resource and language component 130 are made before a user interface is displayed.

The core component 120 manages the lightweight component 110 and the resource and language component 130 in a special way. If either the resource and language component 130 or the lightweight component 120 is missing or out-of-date, the missing or out-of-date component will be installed or updated, respectively, before a user interface 104 is displayed. In this way, the versioning engine is self-updating. That is, the lightweight component 110 ensures that the core component 120 is always current (as described above), and the core component 120 ensures that the lightweight component 110 and resource and language component 130 are always current. This is important because a file cannot update itself while it is running. The user would have to request a download of the server version of the versioning engine 100, disconnect from the network, and then re-connect to the network to execute the newly installed version of the versioning engine. Because the lightweight component 110 and the core component 120 do not run concurrently, however, this embodiment of the present invention provides the ability for the versioning engine 100 to update itself without adversely affecting the user experience.

Once the client versions of the lightweight component 110 and resource and language component 130 have been verified, if no other managed components 30 are missing or out-of-date, the core component 120 simply terminates and the user experience is unaffected.

If the core component 120 determines that any NOUI components are missing or out of date, the core component 120 causes the server 10 to download the installation of upgrade packages associated with these components. The most current version of the NOUI components are installed automatically onto the client 20 without any intervention from the user.

If, however, the core component 120 determines that any mandatory components are missing or out-of-date, the core component 120 displays a user interface 104. The UI 104 includes a text window 140 in which a list of missing or out-of-date components is displayed to the user. The text window displays a list of mandatory and optional components that the core component 120 found to be missing or out of date. In a preferred embodiment, if the core component 120 finds that no mandatory components are missing or out of date, no UI is presented, even if the core component 120 finds that one or more optional components are missing or out of date.

The user interface 104 gives the user an option whether or not to install or update the missing or out-of-date components. If the user does not wish to update the identified managed components, the user selects the "Postpone" button 142 and the core component 120 terminates itself. On the other hand, if the user chooses to install (e.g., by selecting the "Update" button 144), the core component 120 causes the most current versions of the managed components to be installed in the same manner as described above in connection with the lightweight component 110. In general, the installation packages for the managed components 30 can reside on the same server 10a that has the CIF 12, or on a second server 10b. The installation of any of the managed components is subject to the same authentication procedure as described above in connection with the lightweight component.

If the user elects to postpone installation of a mandatory component, the next time the user executes the mandatory component, the user will be notified that a more current version of that component exists. Note, however, that no matter how many times the user executes the out-of-date mandatory component, the user will be notified only once every run interval (e.g., only once every 24 hours) that the mandatory component is out of date.

In a preferred embodiment, the user interface 104 also includes a "details" button 146 that the user can select to retrieve more information on the managed component that the core component has detected as being missing or out-of-date. Also, the UI 104 preferably includes a "Disable" button 148 that the user can select if the user wishes to permanently disable the versioning engine 100 from running on the client 20. The user, by selecting this option, assumes personal responsibility for managing the application software on the client computer without any future assistance from the versioning engine 100.

The core component 120 can also perform tasks such as checking for available disk space before installation, or permitting the user to change the run interval described above. The core component 120 can also report back to the server 10 a list of the managed components 30 a user is scheduled to have installed, as well as the result of the download of each of those components. The core component 120 in a presently preferred implementation is estimated to be about 40 kilobytes uncompressed.

The resource and language component 130 provides the core component 120 with the user interface 104 and any other localizable information. Having the core component 120 manage the resource and language component 130 as a special case solves the core component's localization problem. That is, because the core component 120 ensures that the most current version of the resource and language component 130 is installed before the user interface 104 is presented to the user, the core component 120 ensures that, for example, the user interface will be in the language the user has set for the client computer 20. In addition, as support for more languages becomes available, the core component 120 will be able use the appropriate language component without having to be upgraded itself Another advantage is that the user interface 104 can also be completely changed by simply providing the necessary resource and language component 130 and specifying it in the CIF 12, again without having to upgrade the core component 130 itself.

To solve the problem of globalization and localization, all component specific information can be made dependent on the language setting specified on the client 20. If the client 20 has the language set to German, for example, a German description for a particular managed component can be displayed. The location for the installation package could be different for German, and if the client were switched to German, the German version of a component would be installed. The consideration for globalization allows the correct resource and language component 130 to be installed depending on the language settings of the client so that the correct user interface 104 and any localizable information can be provided to the core component 120 before the user interface 104 is displayed. In terms of size, each resource and language component is about 4 kilobytes, but its size can grow depending on the resources included in it.

More than one resource and language component 130 can reside on the client 20 at the same time. For example, consider a client wherein the language setting is set to German. The first time the installation engine 100 is run on that client, a German resource and language will be downloaded and will remain on the system (unless the engine 100 is uninstalled). Suppose that the user switches the language on that client to French. The next time the installation engine 100 is run, a French resource and language component will be downloaded, and the user interface will appear in French. At this point, the client will have two resource and language components on the machine. If the user switches back to German, and the German resource and language component has not changed, nothing will be downloaded since the correct version of the German resource is on the system already. If the German resource and language component has changed since it was last utilized, the core component 120 will recognize that it changed and cause the component to be updated before the user interface is presented.

In sum, the present invention provides methods for managing applications software on client computers. The methods of the present invention are particularly suited for use in a network environment in which one or more clients are networked with at least one server via a communications network. The communications network can be a LAN, WAN, intranet, or the Internet.

Figure 4:
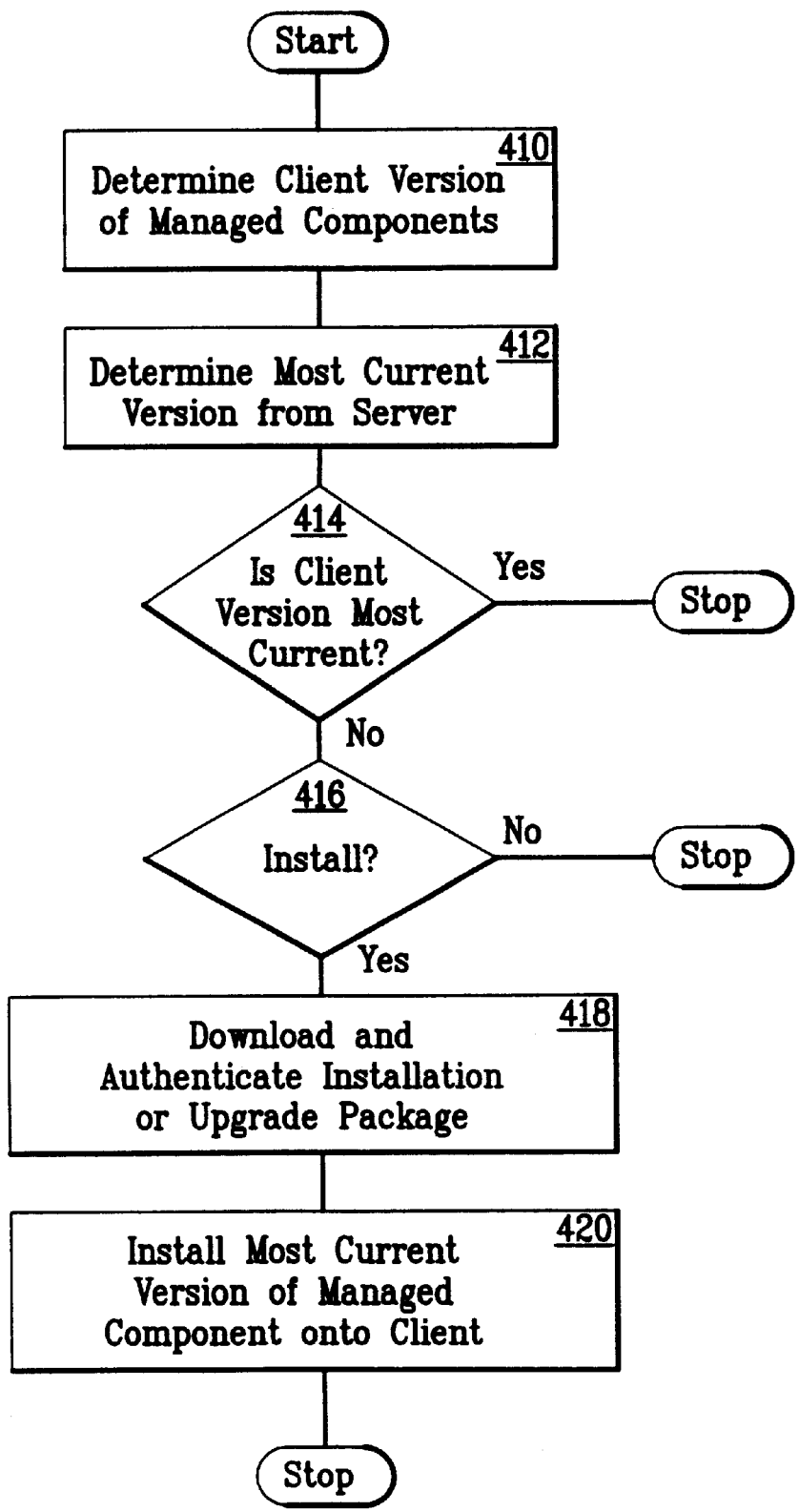
FIG. 4 is a flowchart of a method for managing the distribution of client bits in accordance with the present invention.

FIG. 4 is a flowchart of a method for managing the distribution of client bits in accordance with the present invention. At step 410, the client version of one or more selected applications software components (the "managed components") is determined on the client computer. Preferably, the client computer has a registry that includes an indication of the client version of each of the managed components.

At step 412, the client queries the server to determine the most current version of each of the managed components. Preferably, a component information file (CIF) resides on the server. The CIF includes a list of managed software components, and, for each managed component, the CIF includes an indicator that represents the most current version of the managed component, and a location indicator that represents a location at which an installation or upgrade package for the managed component can be found.

At step 414, if the client version differs from the most current version, (i.e., either the managed component is missing on the client computer, or exists on the client but is out-of-date), an indication is provided indicating that the client version differs from the most current version. Preferably, a user interface is displayed which provides the user with the option to install or upgrade (i.e., download) the missing or out-of-date managed components, or to postpone installation.

If, at step 416, the determination is made to install or upgrade one or more managed components, at step 418 the most current version of each of the selected managed components is downloaded onto the client computer. Preferably, an installation or upgrade package located on the server is downloaded onto the client in compressed format. The installation or upgrade package is authenticated as it is being downloaded by validating a signature that is appended to the package.

At step 420, after the installation or upgrade package has been authenticated and downloaded onto the client computer, the package is uncompressed and installed onto the client. In this way, the most current version of selected applications software components available at the server can be managed across a plurality of clients. Thus, the present invention provides an efficient, secure mechanism to provide new and updated application code, or client bits, to users.

An important feature of the preferred embodiments of the invention is the use of a versioning engine that resides on the client computer to determine the client version of each of a plurality of managed components. If any of the managed components are missing from the client or out-of-date, the versioning engine causes the server to install or update the missing or out-of-date components on the client. It is understood, however, that the invention is susceptible to various modifications and alternative embodiments. It should be understood that there is no intention to limit the invention to the specific embodiments described herein. On the contrary, the invention is intended to cover all modifications, alternative constructions, and equivalents falling within the scope and spirit of the claimed invention.

We claim:

1. A computer readable medium having computer executable components comprising:

a bootstrap component and a core component, wherein:

the bootstrap component determines whether the core component is present on a client computer and, if the core component is not present on the client computer, causes the core component to be downloaded onto the client computer from a server coupled to the client computer via a communications network; and the core component determines a client version of at least one managed component on the client computer, determines a most current version of the managed component as indicated by the server, compares the client version of the managed component to the most current version of the managed component and, if the client version of the managed component differs from the most current version of the managed component, determines whether to download the most current version of the managed component onto the client computer.

2. The computer readable medium recited in claim 1, wherein the bootstrap component is launched in response to initiating a network browser on the client computer, and the bootstrap component launches the core component.

3. The computer readable medium recited in claim 1, wherein the bootstrap component determines a client version of the core component on the client computer, determines a most current version of the core component as indicated by the server, compares the client version of the core component with the most current version of the core component and, if the client version of the core component differs from the most current version of the core component, determines whether to download the most current version of the core component onto the client computer.

4. The computer readable medium recited in claim 3, wherein the bootstrap component requests that the server download the most current version of the core component onto the client computer.

5. The computer readable medium recited in claim 1, wherein the core component requests that the server download the most current version of the managed component onto the client computer.

6. The computer readable medium recited in claim 1, wherein the bootstrap component has an uncompressed size of less than about 20 kilobytes.

7. The computer readable medium of claim 1, wherein the core component downloads the most current version of the managed component from the server onto the client computer without requesting permission from a user at the client computer.

8. The computer readable medium of claim 1, wherein the core component downloads the most current version of the managed component from the server onto the client computer prior to presenting a user interface to a user at the client computer.

9. The computer readable medium of claim 1, wherein the managed component provides to the core component localizable information comprising a user interface and a language set.

10. A server computer comprising a computer-readable medium having stored thereon:
  a most current version of a core component that:
    determines a client version of a software component on a client computer;
    determines a most current version of the software component;
    determines whether the client version of the software component differs from the most current version of the software component; and
    if the client version of the software component differs from the most current version of the software component, provides an indication to a user of the client computer that the client version of the software component differs from the most current version of the software component; and
  computer-executable instructions for downloading the core component to the client computer in response to a request from a bootstrap component executing on the client computer.

11. A computer readable medium having stored thereon a computer executable component comprising a bootstrap component that determines whether a core component is present on a client computer and, if the core component is not present on the client computer, causes the core component to be downloaded onto the client computer from a server coupled to the client computer via a communications network,
  wherein the core component determines a client version of at least one managed component on the client computer, determines a most current version of the managed component as indicated by the server, and, if the client version of the managed component differs from the most current version of the managed component, determines whether to download the most current version of the managed component onto the client computer.

12. A computer-readable medium having stored thereon a computer program for self-updating a versioning engine that updates managed components on a client computer, the computer program comprising:
  a first component of a versioning engine, wherein the first component determines whether a most current version of a second component of the versioning engine is currently stored on a client computer and, if the most current version of the second component is not currently stored on a client computer, downloads the most current version of the second component from a server to the client computer,
  wherein the second component determines whether a most current version of the first component is currently stored on the client computer and, if the most current version of the first component is not currently stored on a client computer, downloads the most current version of the first component from the server to the client computer.

13. The computer-readable medium of claim 12, wherein the second component determines whether a most current version of a third component of the versioning engine is currently stored on the client computer and, if the most current version of the third component is not currently stored on a client computer, downloads the most current version of the third component from the server to the client computer.

14. The computer readable medium of claim 13, wherein the third component provides to the second component localizable information comprising a user interface and a language set.

15. The computer-readable medium of claim 12, wherein the first component is initiated, without direct user intervention, in response to initiating a network browser on the client computer.

16. The computer-readable medium of claim 12, wherein the second component comprises a core component that determines a client version of at least one managed software component on the client computer and, if the client version of the managed software component differs from a most current version of the managed software component, determines whether to download the most current version of the managed software component onto the client computer.

17. The computer readable medium of claim 16, wherein the versioning engine downloads the most current version of the managed software component from the first server to the client computer.

18. The computer readable medium of claim 17, wherein the versioning engine authenticates the most current version of the managed software component before downloading the most current version of the managed software component onto the client computer server to the client computer.

19. The computer readable medium of claim 16, wherein the versioning engine downloads the most current version of the managed software component onto the client computer from a second server.

20. The computer readable medium of claim 16, wherein the versioning engine presents to a user at the client computer a user interface that provides the user with an option to download the most current version of the managed software component onto the client computer; and
  if the user selects the option to download, downloads the most current version of the managed software component onto the client computer.

21. The computer readable medium of claim 16, wherein the versioning engine determines the most current version of the managed software component from a component information file (CIF) residing on the first server, wherein the CIF includes a list of managed software components, and, for each managed software component in the list, the CIF includes a respective indicator that represents the most current version of the managed software component and a location indicator that represents a location at which an installation or upgrade package for the managed software component can be found.

22. The computer readable medium of claim 21, wherein the installation or upgrade package includes a signature, and wherein the versioning engine determines whether the signature is a valid signature; and
  if the signature is a valid signature, downloads the installation or upgrade package onto the client computer.

23. The computer readable medium of claim 16, wherein the first server is connected to the client computer via the Internet.

24. The computer readable medium of claim 16, wherein the first server is connected to the client computer via an intranet.

25. The computer readable medium of claim 16, wherein the first server is connected to the client computer via a local area network (LAN).

26. The computer readable medium of claim 16, wherein the first server is connected to the client computer via a wide area network (WAN).

* * * * *

UNITED STATES PATENT AND TRADEMARK OFFICE
CERTIFICATE OF CORRECTION

PATENT NO. : 6,718,549 B1
DATED : April 6, 2004
INVENTOR(S) : Narin et al.

It is certified that error appears in the above-identified patent and that said Letters Patent is hereby corrected as shown below:

Column 7,
Line 34, after "component 110" insert -- communicates with the server 10 using HTTP. Consequently, the lightweight component --.

Column 8,
Line 58, delete "ifjkl.dat" and insert therefor -- if jkl.dat --.

Column 13,
Lines 47, 54 and 62, delete "a" and insert therefor -- the --.
Line 59-60, there should be no indented paragraph.

Column 14,
Line 17, after "from the" delete "first".
Line 23, after "client computer" delete "server to the client computer".
Line 38, after "residing on the" delete "first".
Lines 53, 56, 59, and 62, after "the" delete "first".

Signed and Sealed this

Seventh Day of September, 2004

JON W. DUDAS
*Director of the United States Patent and Trademark Office*